FIG.-10-O

# United States Patent Office 3,448,510
Patented June 10, 1969

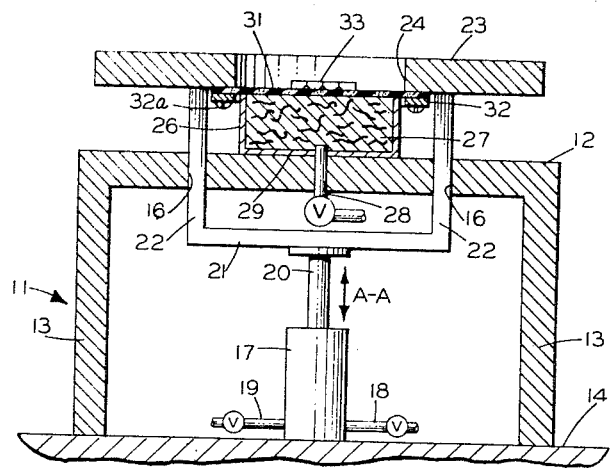
FIG-1
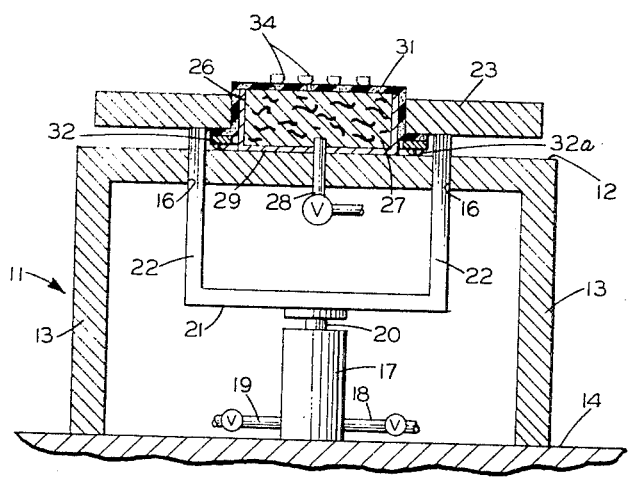
FIG-3
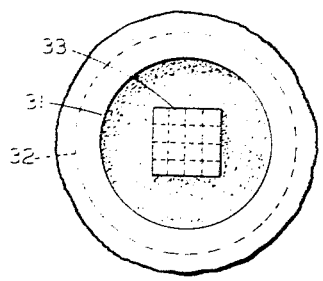
FIG-2
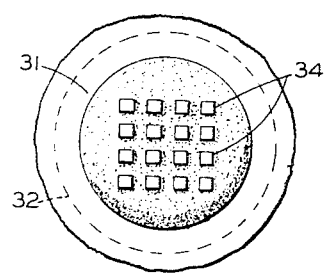
FIG-4
INVENTORS
J.R. BIPPUS
A.F. JOHNSON JR.
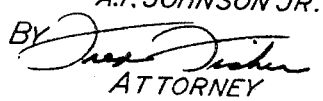
ATTORNEY

3,448,510
METHODS AND APPARATUS FOR SEPARATING ARTICLES INITIALLY IN A COMPACT ARRAY, AND COMPOSITE ASSEMBLIES SO FORMED
Jacob R. Bippus, Pittsburgh, and Anderson F. Johnson, Jr., Sinking Springs, Pa., assignors to Western Electric Company, Incorporated, New York, N.Y., a corporation of New York
Continuation-in-part of abandoned application Ser. No. 551,709, May 20, 1966. This application Jan. 10, 1968, Ser. No. 696,873
Int. Cl. H01r *39/00;* B01j *17/00;* H01l *5/00*
U.S. Cl. 29—413                                    35 Claims

ABSTRACT OF THE DISCLOSURE

The specific embodiments disclosed relate to breaking semiconductor slices into wafers, and handling the freshly formed wafers in such manner as to retain control over them and permit individual handling later. A slice of scribed semiconductor material is broken into discrete wafers and spaced in an oriented array by placing the slice onto a porous deformable substrate, applying vacuum through the deformable substrate to hold the slice in position, and breaking the slice along the scribed lines to form individual discrete wafers. Later, the discrete wafers are spaced apart by stretching the substrate upon which the wafers rest. The latter substrate can be the same as the original deformable substrate or can be a different substrate.

Cross reference to related application

This is a continuation-in-part of applicants' copending application Ser. No. 551,709, filed May 20, 1966, now abandoned.

Background of the invention

The invention relates generally to methods and apparatus for separating articles initially arranged in a compact array, and to composite assemblies so formed. More particularly, the invention relates to separating a semiconductor slice into a plurality of wafers and expanding the wafers into a spaced array, while maintaining their original orientation. Accordingly, the general objects of the invention are to provide new and improved methods, apparatus and assemblies of such character.

In the manufacture of semiconductor devices, such as transistors, diodes, and integrated circuits, a slice of semiconductor material is scribed to form a pattern of squares of wafers indicative of individual devices, frequently referred to herein as a "matrix." Typically, a slice of the order of one inch in diameter is scribed to form a matrix of 2,000 squares, 0.020 inch on a side. The slice is then broken along the scribed matrix to form discrete wafers. Each wafer is subsequently mounted on a support such as a transistor header or a circuit substrate.

In the past, slices have been broken into wafers in a manner which resulted in a disarranged grouping of the wafers, haphazardly deposited in a container for subsequent transporting to a testing, sorting, or storage location. A technique for scribing and breaking semiconductor material is described in SCP and Solid State Technology, July 1965, pages 11–14, "Scribing and Breaking Semiconductor Material" by E. J. Creighton.

In certain types of electronic applications, such as integrated diodes, it is desirable to utilize semiconductor devices which have similar properties. Hence, two or more semiconductor devices can be specified to have electrical parameters or characteristics which are matched to prescribed limits. In the past, when it was desired to match such similar wafers, a semiconductor slice initially was broken into strips, using a sharp edge in a manner similar to that set forth in the Creighton article, and then the strips were broken into wafers. When matching was not of immediate interest, wafers were simply mixed in a container. When matched wafers were described, these wafers were tested and put into individual containers, the test records of the wafers were kept, and the wafers were separated in accordance therewith. Preferably, the parameters of interest and their values were recorded and stored in a data processing system. The resulting test data from the individual devices were compared, and information for sorting the devices into groups having similar values of specific parameters were provided by the data processing system. This process was time consuming, complex, and expensive.

It has been observed that semiconductor devices fabricated from wafers immediately adjacent one another in the unbroken slice are more likely to have similar parameters and characteristics than wafers taken in random fashion from more remote positions in the matrix, or from another slice. Thus, if matched devices are desired, it would seem to be most feasible to select adjacent wafers out of the matrix and use these wafers to fabricate pairs of matching devices. Pairs of devices, thus fabricated, could be tested for correspondence of the specific parameters with a great likelihood that the specified parameters would be within the prescribed correspondence limits. The necessity for storing and comparing data obtained from a large number of semiconductor devices thus would be eliminated.

Pursuant to this end, miniaturized tools, as for example, vacuum probes, have been designed to pick up wafers for transporting to a transistor header for bonding thereto. However, by reason of the crystalline structure of the slice, wafers in the broken matrix generally have edges which either overlay or underlay the edges of adjacent wafers due to the slice breaking along lines other than perpendicular to the surface thereof. A cleavage angle forms, so that, upon picking up a wafer from the matrix, one or more adjacent wafers are disrupted as they tend to "shingle" against each other. No satisfactory method was heretofore known for picking up selected wafers from a scribed and broken slice without disturbing adjacent wafers.

In the fabrication of semiconductor devices, it is often desirable to store the wafers after breaking rather than to immediately assemble the devices so that an adequate supply of acceptable wafers are immediately available. Otherwise, a semiconductor fabricating line might be held up awaiting usable wafers.

Description of specific prior art

A device for separating strip material is described in Hall, Patent No. 2,286,960, which relates to a machine for separating flexible index strips from a sheet thereof. The machine separates the strips positioned relative to each other as they were while in sheet form, so that they may be conveniently handled in removing them from the machine. A laminated sheet of strips is described as being initially partially severed in the direction of its thickness and the unsevered face thereof being stressed during passage between a pair of rollers to an extent as to tear the connections between adjacent strips. The laminated sheet is supported on a rigid carrier, faced with a resilient cushion, such as sponge rubber, and passed between a pair of rollers with the scored surface of the sheet uppermost. The laminated sheet carried upon the upper surface of the cushion is described as being brought into contact with the upper roller and the individual strips being caused to follow the surface of the roller for a considerable angle due to the abrupt dip which takes place in the cushion during the passage between the two rollers. In passing around the surfaces of the rollers, the lower surface of the sheet of the strips is subjected to tension and the sheet severs between adjacent strips.

Hobbs, Patent No. 3,105,623, sets forth a method of separating into pieces a semiconductor slice. A scribed slice is held in place on a resilient substrate with sticky paper tape. A roller thereon creates bending moments to separate the slice into small pieces. The tape, then, is removed with the broken slice adhering thereto.

Meyer et al. Patent No. 3,206,088, relates to a method for dividing semiconductor slices into smaller bodies whereby a slice is held by adhesive to a polyvinyl chloride sheet with a roller being used to break the slice. Alternatively, the slice can be broken by dipping the polyvinyl chloride sheet into a swelling agent, such as acetone, in order to thereby produce breaking stresses for dividing the large area semiconductor slice into small bodies along the severance traces. After a slice is broken, it can be kept adherent to the carrier sheet in order to keep it stored.

Summary of the invention

Another object of this invention is to provide new and improved methods and apparatus for separating and spacing articles originally oriented in a compact array at higher speeds and lower costs than heretofore known.

It is a further object of this invention to provide new and improved methods and apparatus for enabling semiconductor wafers to be picked up from an array of a broken semiconductor slice without the disruption of adjacent wafers.

It is an object of this invention to provide methods of and apparatus for separating adjacent wafers which are arranged in a compact spatial array such that the separated wafers retain the same oriented relationships with respect to one another after separation as before separation.

It is a further object of this invention to provide methods of separating and spacing wafers that are initially arranged in a compact matrix without materially altering the initial orientation among the wafers, and then packaging the spaced separated wafers for the subsequent use thereof.

With these and other objects in view, the present invention contemplates the utilization of a stretchable diaphragm mounted in a first plane for supporting wafers thereon which are initially in a compact group. The diaphragm is stretched while the portion of the diaphragm that supports the wafers is maintained in the first plane, or in a plane parallel to the first plane. The stretching of the diaphragm produces separation among adjacent wafers so that the relative orientations of the wafers are substantially unchanged.

In accordance with one embodiment of the invention, a porous stretchable wafer-supporting diaphragm overlays a vacuum chuck. After stretching the porous diaphragm to effect a separation of the wafers, a vacuum is applied to the vacuum chuck to hold the now-spaced wafers firmly against the porous surface. A porous slab susceptible of attraction by magnetic forces is placed upon the wafers and a second vacuum chuck is applied to the top surface of the porous slab. The vacuum is removed from the first vacuum chuck and applied to the second vacuum chuck to hold the wafers against the porous slab. The second vacuum chick, holding the porous slab and the spaced wafers thereagainst is inverted and a slab of magnetic material is placed over the inverted spaced wafers. The vacuum in the second chuck is released to permit the removal of the sandwich formed by the two slabs and the spaced wafers therebetween.

In accordance with another embodiment of the invention, articles in a matrix are separated by placing the matrix of articles onto a resilient substrate and stretching the substrate to displace the articles.

In yet another embodiment, a method of breaking a frangible member having scribed lines thereon definitive of a predetermined configuration of component parts to be formed, and separating the broken component parts, includes placing the member onto a deformable member, pressing the frangible member against the deformable member to break the frangible member along the scribed lines, and deforming the deformable member to stretch the surface thereof to separate the component parts. Specifically, in one form of the invention, the method can be applied to forming a spaced array of discrete semiconductor wafers from a slice of semiconductor material scribed on one face thereof by placing the semiconductor slice on one surface of a resilient stretchable supporting diaphragm with the scribed face thereagainst, supporting the peripheral edge of the diaphragm to form a resilient slice breaking surface, pressing the slice against the diaphragm to break the slice along the scribed lines and form individual wafers, and stretching the diaphragm uniformly in directions outwardly from the center thereof until a predetermined separation is effected among the adjacent wafers.

In yet another embodiment of the invention, a novel composite assembly of articles and a supporting member includes a stretched sheet of a material with a plurality of articles on the sheet arranged in a predetermined spaced, planar array with the spacing governed by the degree of stretching of the sheet.

In still another embodiment of the invention, an apparatus for separating a mass of individual articles includes a member having deformable properties for supporting the mass of articles, and means for expanding the member, by stretching, to separate the articles.

Yet another embodiment of the invention describes an apparatus for breaking a frangible member and for separating the component parts, including deformable and stretchable substrate means for supporting the member, a tool for breaking the member into its component parts by applying force thereto against the deformable substrate means, and means for expanding the stretchable substrate means, by stretching, to separate the component parts. In one embodiment, the deformable and stretchable substrate means includes a common substrate. In another embodiment, the deformable and stretchable substrate means includes a separate deformable substrate and a separate stretchable substrate.

More specifically, the invention contemplates an apparatus for separating semiconductor wafers which are initially in a compact arrangement with adjacent wafers in substantially abutting relationships, wherein the apparatus includes a diaphragm having a resilient, stretchable portion for supporting the wafers thereon in their initially compact arrangement, means for holding the diaphragm in an initially flat condition so that the wafers lie supported on the stretchable portion, and means coupled to the peripheral edge of the diaphragm for applying an outwardly directed force to stretch the stretchable portion until a predetermined separation is effected among the adjacent wafers.

Apparatus is contemplated for separating semiconductor wafers from a slice of semiconductor material having scribed lines on one face thereof, including a housing having an opening at the top, support means for the slice adapted for vertical movement in the opening, the support means being porous to permit vacuum to be applied thereto to hold the slice, and a transfer member adapted for vertical movement in general alignment with the support means, the transfer member being adapted to permit the passage of vacuum therethrough.

In another embodiment of the invention, as an article of manufacture, a sandwich of spaced semiconductor wafers includes a first slab such as sintered nickel having paramagnetic properties, a plurality of spaced, oriented semiconductor wafers deposited on the first slab, and a second slab such as magnetic rubber having ferromagnetic properties, whereby the two slabs are attracted to each other, holding the wafers therebetween.

In yet another embodiment of the invention, spaced semiconductor wafers are picked up after spreading and held on a support including a disc such as glass coated with an attractive substance such as a silicone compound, such that the spaced wafers adhere to the coated surface of the disc.

*Brief description of the drawings*

Other objects, advantages, and features of the invention will become apparent by reference to the following detailed specification and drawings of specific embodiments thereof, wherein:

FIG. 1 is a sectional view of an apparatus, constructed in accordance with the principles of one embodiment of this invention, for separating an initially compact grouping of wafers;

FIG. 2 is a plan view of a stretchable diaphragm, for use with the embodiment shown in FIG. 1, for supporting a compact grouping of wafers;

FIG. 3 is a sectional side view of the apparatus, similar to a portion of that shown in FIG. 1, but showing the position of the apparatus after the wafers have been separated;

FIG. 4 is a plan view of the diaphragm, illustrated in FIG. 2, which has been stretched, and further depicts the wafers in their separated condition;

Figure 5A:
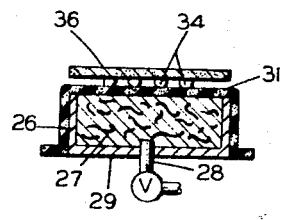
FIGS. 5a–e, illustrate the sequence of steps involved in packaging the separated wafers in accordance with one embodiment thereof.

*Description of one embodiment of this invention*

Referring now to FIG. 1, there are shown facilities for implementing a method of this invention, according to one embodiment thereof. These facilities include a table 11 having a horizontal top 12 supported by legs 13 that are affixed to a base 14. Two bores or passageways 16 extend vertically through the horizontal top 12 of the table 11. An air cylinder 17 is fixedly mounted on the base 14 between the legs 13 and has an air intake valve 18 and an air exhaust valve 19. A piston rod 20 is slidable in the cylinder and is movable in the direction indicated by arrows A—A. The upper end of the piston rod 20 mounts a U-shaped yoke 21 that includes two vertical arms 22 which are movable in the directions of the arrows A—A through the passageways 16 in the table 11. A magnetizable plate 23, composed of iron or other suitable material, is affixed to, and supported by, the upper ends of the arms 22.

The vertical movement of the yoke 21 is effected by the operation of the air cylinder 17. To illustrate, with the exhaust valve 19 of the air cylinder 17 closed and the intake valve 18 open, air pressure applied to the intake valve 18 from a source of compressed air, not shown, displaces the piston 20 upward and then holds the piston in its displaced position, thereby maintaining the yoke 21 in the elevated position depicted by FIG. 1. The plate 23 is formed with a circular opening 24 located generally in the center of the plate. Resting upon the table 11 below the circular opening 24 is a cylindrical, cup-like member 26 having an outer diameter less than that of the opening 24. A block 27 composed of porous material, such as sintered nickel, is inserted into the member 26, with preferably an interference fit to form the head of a vacuum chuck.

A vacuum pipe 28 communicates with the block 27 through the closed end 29 of the member 26. The connection between the pipe 28 and the member 26 is air-tight, so that when vacuum is applied to the lower end of the pipe 28, air is sucked downward through the block 27. A circular resilient supporting member for the wafers is formed by clamping a porous, stretchable diaphragm 31 to a circular ring 32 by screws 32a, adhesives, or the like, or, in the preferred mode, by using a magnetized circular ring 32 which is attractable to the magnetizable plate 23. The diaphragm 31 spans the circular opening 24 and rests lightly upon the block 27.

A "slice" of semiconductor material, as used herein, include portions of a slice. Hence, a "slice" may be square as illustrated in FIG. 2. Other cross-sectional configurations are included by the term "slice." A full silicon slice is generally circular in shape while a germanium slice assumes the shape similar to that of a slice of bread, having one flat side and other curved sides.

In a method of this invention, a thin semiconductor scribed slice 33 to be broken into small rectangular wafers 34 along the scribed lines is placed upon the diaphragm 31. The lines can be initially scribed with a diamond point by machine in a standard manner. The scribed face is placed "down," against the diaphragm. As depicted somewhat schematically in FIG. 2, the slice is formed with a grid work pattern of scribed lines along which the slice is to be broken to form the wafers. It is not essential that the slice 33 be centered precisely on the circular diaphragm 31, but a more symmetrical separation of the wafers 34 is obtained when the slice 33 is so centered. A transparent flexible film (not shown, in order to simplify the drawings, is placed over the plate 23 and vacuum is applied to the vacuum pipe 28, thereby drawing the film and the slice 33 firmly against the porous diaphragm 31 and attracting the diaphragm against the porous block 27. This film may be composed of, for example, cellophane or polyethylene terephthalate (sold under the trademark Mylar). An operator then applies a force to the scribed slice 33 by pressing a wafer-breaking tool (such as a cuticle stick, a roller, a mimeograph stylus, or a fingernail), not shown, against the film-covered upper surface of the slice, and moving the tool back and forth until the slice breaks along the scribed lines. Pressure is applied to the non-scribed surface in a manner analogous to breaking glass. The transparent flexible film may now be removed from the formed, substantially rectangular, individual wafers 34 and the vacuum removed from the block 27.

It has been found that rollers are acceptable for breaking slices only when all of the scribing conditions are ideal, and the slice material is nearly flawless. Breaking takes place by passing a roller over the slice twice, in mutually perpendicular directions. Yields vary to each extreme.

With the stick breaking method described herein, preferential treatment can be given to areas that were not ideally scribed. The breaking pattern can be seen developing during the treatment and, when breaking takes place properly, one can go over the area hurriedly. If the slice breaks erratically—not in square patterns as it should— the area under concern can be given special treatment by going over it repeatedly. A stick, similar to a cuticle stick constructed of hard and durable material such as teakwood, generally cylindrical in shape with an angled cut at one end to form an elliptical working surface, is preferred.

In order to effect a separation among the individual wafers 34, the diagram 31 is next stretched, preferably uniformly in all directions in the plane of the diaphragm, as illustrated in FIG. 4. In general, one-fourth to one-third expansion of the entire matrix is considered desirable. For this purpose, the intake valve 18 is closed to stop the flow of pressurized air to the air cylinder 17 and the exhaust valve 19 is opened. The weight of the plate 23 and yoke 21 is sufficient to force the air in the air cylinder 17 out of the exhaust valve 19, thus causing the yoke 21 to descend from the position shown in FIG. 1 to that shown in FIG. 3. Since the diaphragm 31 is clamped to the plate 23 across the central opening 24, and since that opening is slightly larger in diameter than the outer diameter of the cup-like member 26, the plate 23 as it descends stretches the diaphragm 31 across the top of the block 27, and carries the outer edges of the diaphragm approximately at right angles downward around the periphery of the cup-shaped member 26. This action slowly stretches the diaphragm 31 across the circular edge of the porous block 27, thereby separating the wafers 34. Various ways can be employed to effect the stretching of the diaphragm, and thereby separate the wafers 34 according to the disclosed process. In this particular embodiment, the portion of the diaphragm 31 which supports the wafers 34 remains horizontal even though peripheral edges of the diaphragm 31 are stretched vertically.

Porous non-woven mats or filters composed of materials such as polyvinyl chloride, polytetrafluoroethylene, or nylon provide satisfactory diaphragms 31. Several types of filters which have been found suitable for use as such diaphragms are sold by the Millipore Filter Corporation of Bedford, Mass. as Polyvic, Mitif, and Duralon-64, respectively. Produced of pure nylon, Duralon-64 filters are microporous structures having properties similar to cellulose ester filters, in addition to being resistant to chemical attack by various liquids including ketones and esters. These nylon filters are strong, flexible, and uniform in pore size, the type NR Duralon-64 filter being advertised as having a pore size of $1\mu \pm .3\mu$. One particular advantage that lies with a non-woven nylon fiber is that, because nylon is inherently hygroscopic, the filter can be moistened with water and stretched to several times its original length or size. For instance, it has been observed that non-woven, wholly nylon filters that are saturated with water may be stretched to approximately seven times their original dimensions.

Nylon filters, saturated with water, when stretched, tend to partially return — approximately half-way — to their original condition. Thus, partial deformation occurs. A nylon filter, however, when permitted to dry in its stretched condition, remains in the stretched condition after drying. In order to obtain uniform results with nylon, it is desirable to control humidity. When the nylon is too dry, it does not stretch, but tears like paper. When it is too wet, the wafers stick thereto and cannot be easily removed.

The type NR Duralon-64 nylon filter paper, sold by the Millipore Filter Corporation is a brittle paper which becomes elastic when wet. Undesirably, wafers affixed to such a wetted nylon filter paper tenaciously adhere thereto. It has been found, however, that by initially treating the type NR filter by wetting and heating to dry, the paper becomes elastic, but not tenacious. An example, by way of illustration, for preparing the paper includes the following steps:

(1) immerse nylon paper in deionized water;
(2) remove paper from water and place paper on a highly polished surface which is heated to a temperature in the range of 60°–70°/C.;
(3) roll paper with a roller to remove excess water until paper is white;
(4) allow paper to dry on a heated surface for approximately 2¾ minutes; and
(5) remove paper and use immediately.

A porous rubber sheet may also be used as a diaphragm. Since this type of diaphragm is both stretchable and retractable, it may be used repeatedly. Tightly knitted and woven fabrics composed of artificial or natural fibers which exhibit the properties of being stretchable and retractable may also be used repeatedly to effect the separation of the wafers, as long as the enlarged interstices formed by stretching the fabric do not exceed the dimensions of the smallest wafer that is supported by the diaphragm.

After the separation of the wafers is effected, certain or all of the individual wafers may be picked up by a conventional vacuum probe without disrupting adjacent wafers.

In further accord with the instant invention, the wafers 34 can be packaged in the separated and oriented state for storage and subsequent use. One such method for packaging the wafers is illustrated in the sequence diagrams FIGS. 5a–e. In this embodiment, vacuum is again applied to the vacuum pipe 28 to draw the separated wafers 34 firmly against the diaphragm 31, and to draw the diaphragm 31 against the porous block 27. A sheet of sintered nickel 36, in the range of $\frac{1}{16}$ to $\frac{1}{8}$ inch in thickness, FIG. 5a, is placed upon the wafers 34. The sintered nickel 36, having paramagnetic properties, is susceptible of magnetization and attraction by a magnetic force, and it should be sufficiently porous to allow air to be drawn therethrough.

Figure 5B:
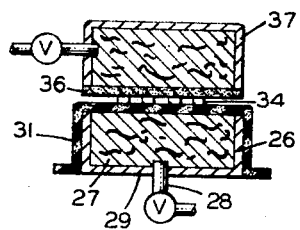
Figure 5C:
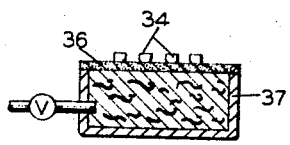
Figure 5D:
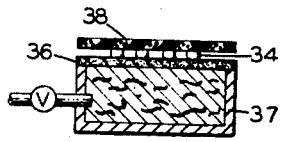

Vacuum is switched from the lower block 27 and applied to the sheet 36 by an upper vacuum chuck 37, as depicted in FIG. 5b. It does not matter the order in which the switching occurs, as the vacuum can be applied first to the upper block and then removed from the lower block, or vice versa. Alternatively, the vacuum can be switched simultaneously. The upper vacuum chuck 37 and its associated vacuum-producing mechanism, not shown, may be similar to the above-described lower vacuum chuck facility, with the exception that, whereas the lower vacuum chuck is stationary, the upper vacuum chuck is preferably of a conventional type that may be moved or swung 180° about a pivotal axis. The sheet 36 is raised and inverted while vacuum is applied thereto by the vacuum chuck 37 and the separated wafers 34 are carried along with the sintered nickel sheet 36, FIG. 5c, to inverted upright positions. A sheet of ferromagnetic material 38, such as a sheet of flexible rubber impregnated with magnetized iron filings, is now placed over the spatially separated wafers 34, as shown in FIG. 5d and vaccum is removed from the second vacuum chuck 37. The resulting packaged "sandwich" is designated by the numeral 41 in FIG. 5e. The ferromagnetic sheet 38 can consist of "magnetic rubber," which is a composition of plastic and magnetic material having magnetic and rubber properties.

Figure 5E:
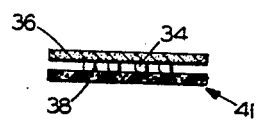

The sandwich 41 comprises the spatially separated wafers 34 which are held firmly against displacement between the sheets 36 and 38, FIG. 5e, due to the attraction between the magnetic rubber sheet 38 and the magnetizable nickel sheet 36. The sandwich 41 can be handled and stored as an integral package until such time as the separated wafers 34 are needed. When the wafers 34 are to be used, the sandwich 41 man be reapplied to any conventional vacuum chuck with the porous sintered nickel sheet 36 placed against the vacuum head. After vacuum is applied to the chuck, the ferromagnetic sheet 38 may be removed to expose the separated wafers 34 for vacuum pickup or for any other desired purpose.

*Description of another embodiment of this invention*

Apparatus for breaking and for separating the semiconductor slice can take various forms. One form which has been constructed, and considered by the inventors to be the best mode contemplated for carrying out their invention, includes the apparatus depicted in FIGS. 6 through 8.

Figure 6:
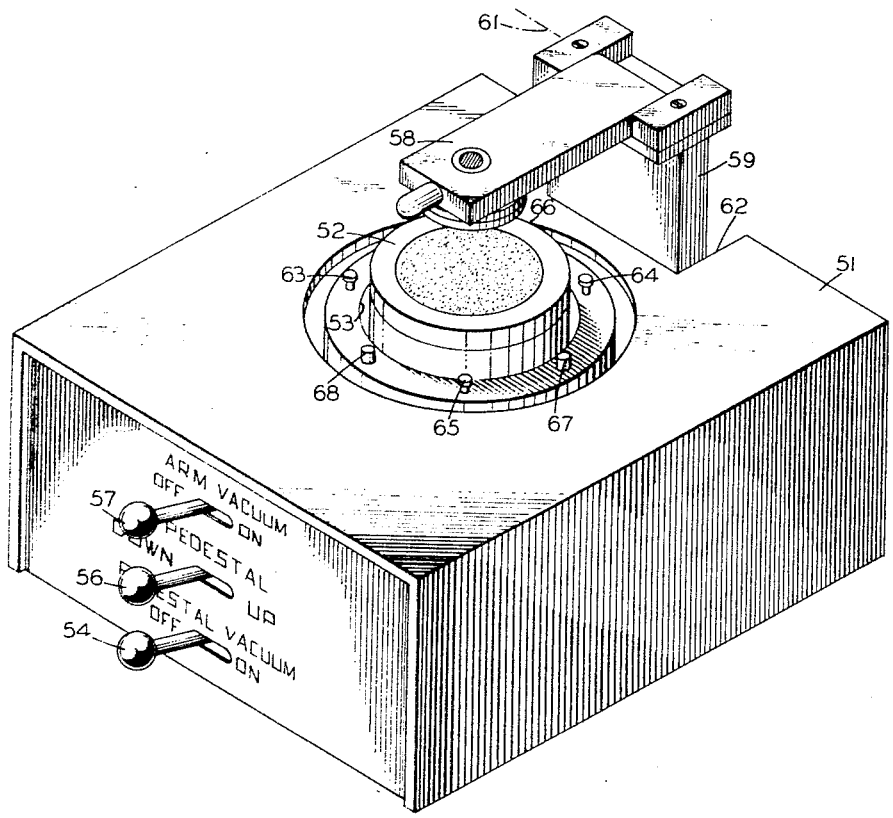
FIG. 6 is a perspective view of an apparatus constructed in accordance with the principles of another embodiment of this invention, the apparatus including a pedestal support illustrated in its lowered position.

FIG. 6 is a perspective view of a suitable wafer matrix expansion mechanism including a generally box-shaped housing 51 having a circular opening 53 at the top thereof for vertical movement of a pedestal support 52 therewithin. The pedestal support 52 moves up and down within the opening 53 under the control of a vacuum-operated mechanism contained within the housing 51. The operation of a "Pedestal Vacuum" switch 54 selectively applies or terminates vacuum to the pedestal support. A "Pedestal" switch 56 selectively is coupled to pneumatically raise and lower the pedestal support 52. An "Arm Vacuum" switch 57 is coupled to selectively apply or remove vacuum from a transfer arm 58. The transfer arm 58 is pivotably coupled to a bracket 59 about an axis 61, and has a "floating head" which is self-aligning so as to minimize the force applied between the arm and pedestal. The bracket 59 is vertically slidable within a guideway 62 at the rear of the housing 51.

A plurality of retaining pins 63, 64, 65 and guide pins 66, 67, 68 are disposed circumferentially about the opening 53 at the top of the housing 51.

Figure 7:
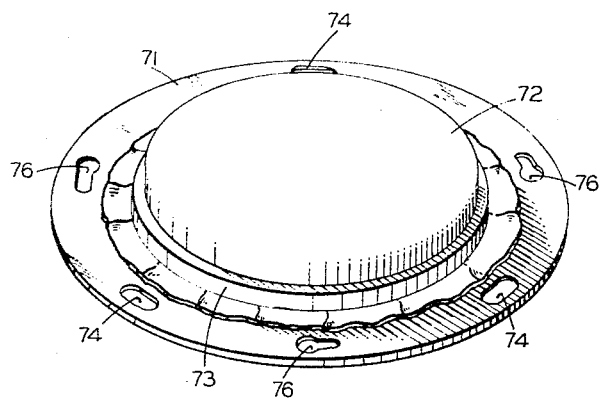
Fig. 7 illustrates a rubber membrane held as a diaphragm by an annular plate and retaining ring.

FIG. 7 illustrates an annular plate 71, a non-porous, resilient, rubber membrane support 72, and a retaining ring 73, in combination. A rubber sheet, held taut as the membrane support 72, is wedged between the two concentric members 71, 73. The retaining ring 73 holds the rubber membrane support 72 onto the annular plate 71 in a manner similar to that used in scroll work for knitting or weaving in holding a cloth. The annular plate 71 includes a plurality of openings 74—74 which fit over the guide pins 66, 67, 68, together with a plurality of guide slots 76—76 which are engageable with the retaining pins 63, 64, 65 at the top of the housing 51. The rubber support 72 can then be affixed atop the pedestal support 52 by locking the outer annular plate 71 to the retaining pins 63, 64, 65 of the housing 51. Hence, the rubber support 72 is adapted to be locked in place over the pedestal support 52 by a quick release mechanism.

Dental dam, a surgical rubber used by dentists, is a rubber sheeting which has been found suitable as a resilient stretchable support 72. Preferably, a 30 gauge sheeting (approximately 1/32 inch thick) cut to a 3 inch diameter yields satisfactory results. Dental dam is desirable because it is the thinnest sheet that is presently commercially available. It has been found that thin sheets are easier to stretch than sheets which are relatively thick.

The pedestal support 52 contains sintered steel, because of its porosity, at the top thereof so that vacuum can be applied thereto.

Figure 8:
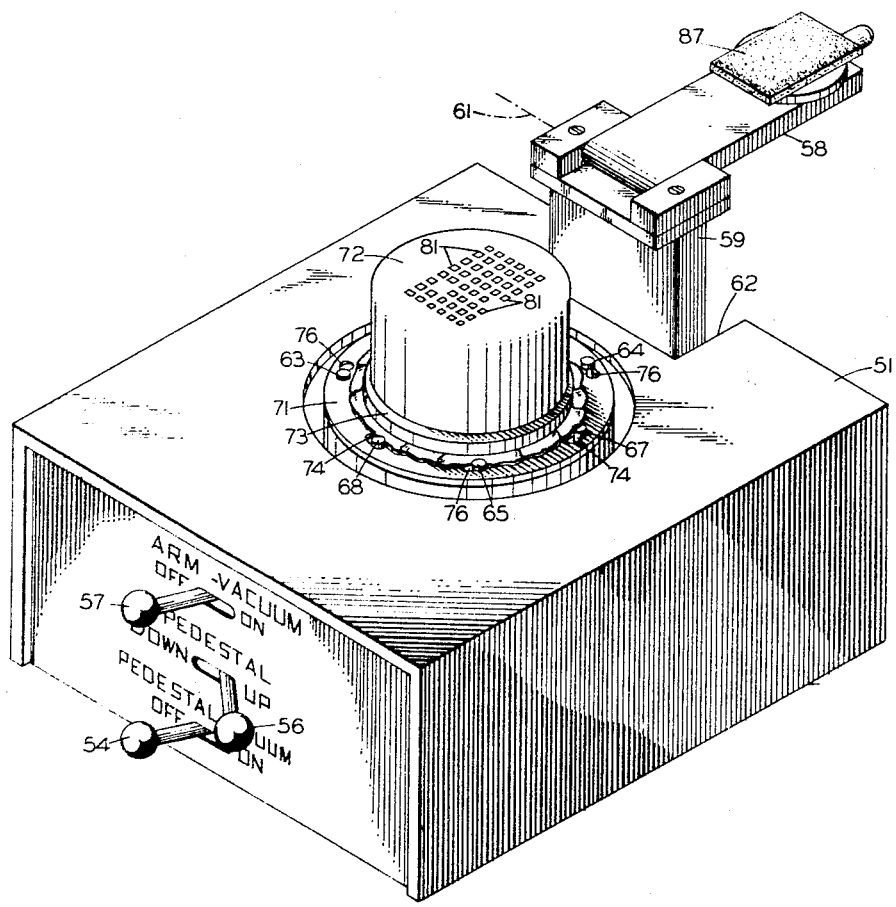
FIG. 8 is a perspective view of the apparatus shown in FIG. 6 with the rubber membrane affixed over the pedestal, the pedestal being shown in the raised position.

The operation of the apparatus illustrated in FIGS. 6 to 8 will become more apparent from a discussion of the various methods illustrated in FIGS. 9a–g and 10a–r.

Figure 9A:
FIGS. 9a–g, inclusive, illustrate a method of separating wafers in accordance with another embodiment of this invention.
Figure 9B:
Figure 9C:
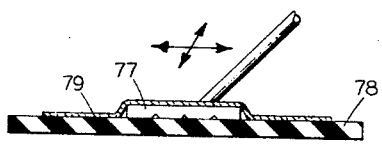
Figure 9D:
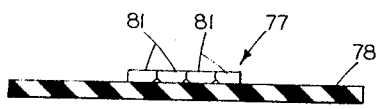

FIGS. 9a–g illustrate various steps in practicing one method of this invention. As shown in FIG. 9a, a scribed semiconductor slice 77 is placed, scribed face down, onto a resilient support 78. Next, as shown in FIG. 9b, the semiconductor slice is covered with a protective film 79 of cellophane or polyethylene terephthalate, for example. Next, as shown in FIG. 9c, the protective film-coated slice is pressed with a tool which is moved back and forth until the slice 77 breaks along the scribed lines forming the individual wafers 81—81. The protective film 79 is removed, leaving the formed individual wafers 81—81 resting on the resilient support 78, FIG. 9d.

Figure 9E:
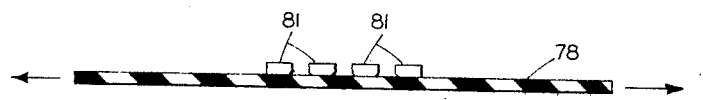

As illustrated in FIG. 9e, the resilient substrate 78 is then stretched, thereby separating and spacing the individual wafers 81—81.

Figure 9F:
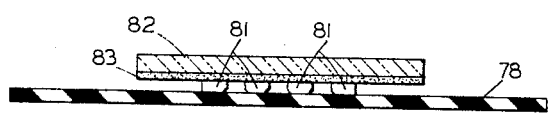
Figure 9G:
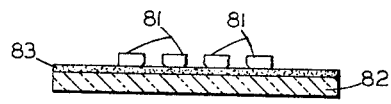

With the substrate still in its stretched condition, an attractive member such as a sheet or disc of glass 82 coated with a film 83 of attractive material such as a silicone resin, is brought down over the separated wafers 81—81 into contact therewith as illustrated in FIG. 9f. The description of a silicone resin used in combination with a glass disc for attracting transistors is set forth in a copending application by William R. Wanesky, entitled "Releasable Mounting and Method of Placing an Oriented Array of Devices on the Mounting" filed Oct. 9, 1967. Ser. No. 673,900 and assigned to the assignee of this application. The subject matter of that patent application is incorporated herein by reference. The coated glass 82 can be inverted, FIG. 9g, with spaced wafers 81—81 held thereto. FIGS. 9a–g therefore illustrates one of several embodiments for carrying forth various methods of this invention.

Figure 10A:
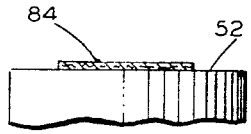
FIGS. 10a–r, inclusive, illustrate still another method of separating wafers, which should be read in conjunction with FIGS. 6 through 8 which show an apparatus for carrying forth such method.
Figure 10F:
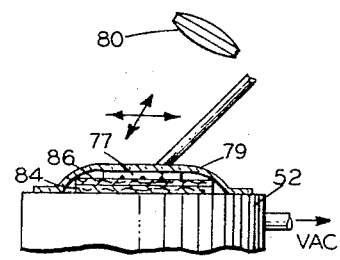
Figure 10B:
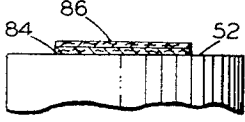
Figure 10G:
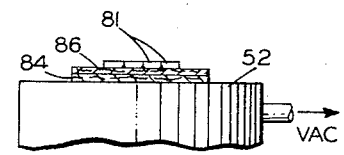
Figure 10C:
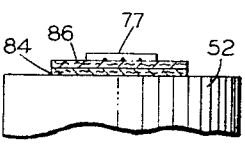
Figure 10H:
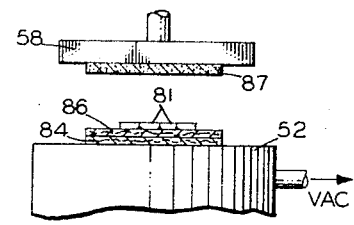
Figure 10D:
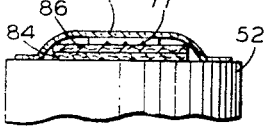
Figure 10I:
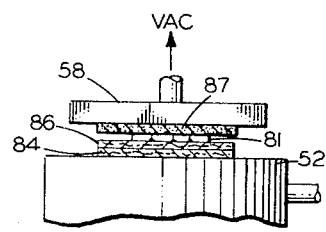
Figure 10E:
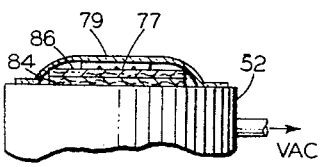
Figure 10J:
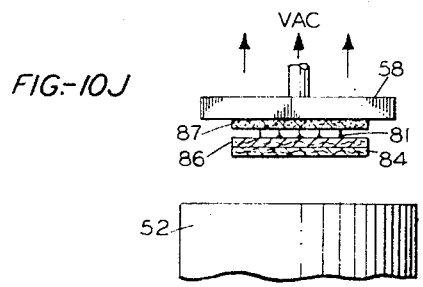
Figure 10J:
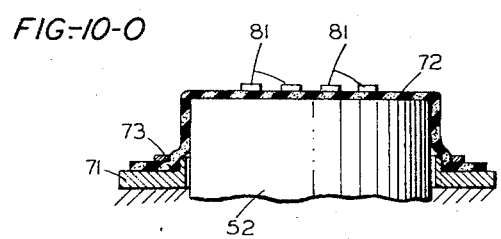
Figure 10K:
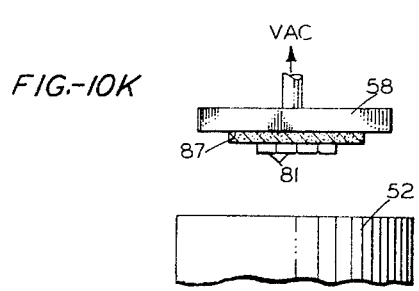
Figure 10P:
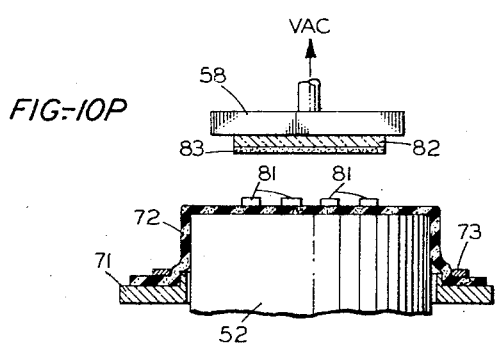
Figure 10L:
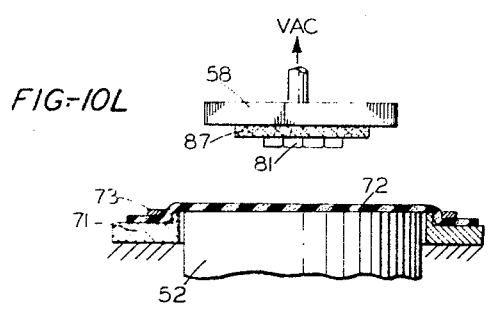
Figure 10Q:
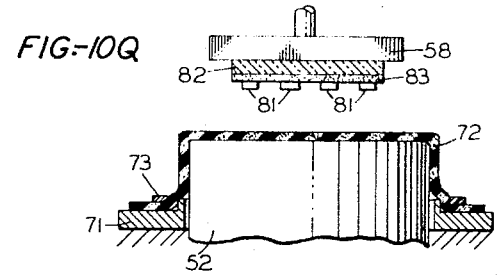
Figure 10M:
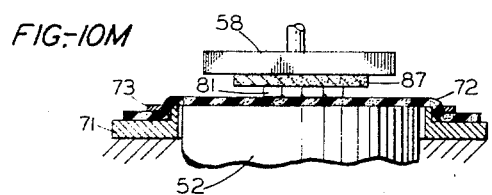
Figure 10R:
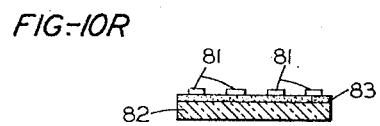

Another method for practicing the invention is illustrated in FIGS. 10a–r and should be read in conjunction with the views of FIGS. 6 through 8 which show one form of apparatus for carrying out such method.

Initially, relatively heavy filter paper 84 is placed onto the porous top of the pedestal 52 of the wafer matrix expansion apparatus, see FIG. 10a. Suitable filter paper can include type AP 1004700 sold by the Millipore Corporation, Bedford, Mass.

Next, FIG. 10b, a thin porous paper 86 such as "Dexilose" paper is placed on top of the heavy filter paper 84.

Next, as shown in FIG. 10c, a slice 77 is placed onto the thin porous paper 86 with the scribed face down.

Then, as illustrated in FIG. 10d, a transparent sheet 79 of nonporous material such as cellophane is placed over the slice 77 to act as a protective film.

The "Pedestal Vacuum" switch 54 is placed in the On position, see FIG. 6, thereby attracting the protective film 79 and, with it, the slice 77 to the pedestal support 52, see FIG. 10e.

With the vacuum applied, the slice 77 is broken into individual wafers 81—81 by using a breaking stick, such as a cuticle stick cut at an angle to form an elliptical working surface. The breaking stick is moved to and fro and pressed along the slice 77 in one direction and then moved to and fro at right angles with respect thereto to break in the other direction. During the breaking operation, the operator views the fracturing of the slice 77 into individual wafers 81—81 through the transparent protective film 79 by means of a magnifying lens 80, for visual aid while breaking and to check for complete breaking, FIG. 10f.

With the vacuum still applied to the pedestal 52 to keep the wafers in place, the protective film 79 is removed, using a slow peeling motion being careful not to displace any of the wafers 81—81, see FIG. 10g. A porous metallic plate 87 is affixed to the transfer arm 58, see FIG. 8. The transfer arm 58 is pivoted about the axis 61 to place the porous plate 87 in position over the wafers 81—81 as illustrated in FIG. 10h. The porous plate 87 can be porous sintered nickel having 40% density 1/16" x 1" x 1", sold under the trade name "Foametal" by General Electric Co., Inc. The porous plate 87 is magnetically held to the transfer arm 58.

The transfer arm 58 is lowered, with the bracket 59, against a compensating spring (not shown for simplicity of illustration) until the porous plate 87 makes contact with the wafers 81—81. The transfer arm 58 is held in this position, the Arm Vacuum switch 57 is turned "On," and the Pedestal Vacuum switch 54 is turned "Off." Hence, as illustarted in FIG. 10i, vacuum is switched from the lowermost pedestal to the uppermost transfer member.

The transfer arm 58 (attracting the wafers 81 by vacuum) and the associated bracket 59 are permitted to return slowly to the rest position by releasing gradually with the hand, as shown in FIG. 10j. The porous papers 86 and 84 also adhere to the wafers 81 or plate 87 at this stage. The arm 58 is then rotated 180° about the axis 61 in the position shown in FIG. 8.

A pair of tweezers is slid gently under the porous paper 86 and that paper is slowly removed. Then, the filter paper 84 is slowly removed, FIG. 10k. Note that, for simplicity, FIG. 10k does not illustrate the inversion of the transfer member, as in FIG. 8. The inversion of the transfer member is not mandatory but is highly perefrable. Caution is used in removing these papers 86–84 so as not to disturb the wafers 81—81. The wafers are now contact side up on the plate 87, and any stacked wafers may be removed by using a vacuum pickup needle in accordance with known techniques.

Next, the annular plate 71 and the rubber membrane 72 held by the retaining ring 73, shown in FIG. 7, is attached over the pedestal support 52 by placing it over the pins 63–68 and by rotating clockwise to lock in place. Thus, as illustrated in FIG. 10l, the sheet of rubber 72 is affixed to the frame so that the sheet 72 extends over the pedestal 52. Next, the transfer arm 58 and its movable bracket 59 is lowered down against the spring bias until the wafers 81—81 make contact with the rubber sheet 72. The transfer arm is held in this position and the Arm Vacuum switch 57 is switched to the Off position (see FIG. 10m).

Figure 10N:
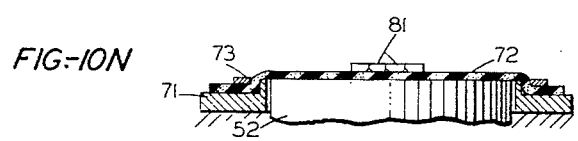

The transfer arm 58 and bracket 59 is permitted to return to its rest position and the transfer arm is rotated about the axis 61 to its back position. At this point, the wafers 81—81 are now in contact face down on the rubber sheet 72 as illustrated in FIG. 10n. The wafers 81—81 remain on the rubber sheet 72 due to both gravity and residual static forces.

The "Pedestal" switch 56 is actuated, pneumatically raising the pedestal 52, stretching the rubber sheet to spread and separate the wafers 81—81 as illustrated in FIG. 10o. All wafers should be laying flat. Those wafers that do not, such as those which are out of position or stacked, can be removed with a vacuum pickup.

The porous metal plate 87 is cleaned and dust removed with a suitable brush and removed by lifting from the transfer arm. The glass disc 82 coated with the attractive substance 83 is placed adjacent to the transfer arm 58. The Arm Vacuum switch 57 is turned "On" so that the glass disc 82 is held to the transfer arm 58 by vacuum. The transfer arm 58 with the glass disc 82 is rotated into position over the spread wafers 81—81 as shown in FIG. 10p. The transfer arm 58 and bracket 59 are lowered slowly downward against the spring bias until the glass disc makes contact with the spread wafers 81—81. Then the transfer arm is permitted to return slowly to its rest position, removing the wafers 81—81 from the rubber sheet 72, see FIG. 10q. The transfer arm is rotated to its back position, whereby the wafers are now on the glass disc contact face up. The Arm Vacuum switch 57 is turned "Off" so that the glass disc 82 can be removed with the wafers 81—81 supported thereon as illustrated in FIG. 10r.

In normal operation, eventually the rubber sheeting on the annular plate becomes dirty and/or sticky and should be replaced with a new one. The new rubber sheeting should be washed with soap and water to remove talcum powder (normally present in commercially sold dental dam), a contaminant, and other dirt, rinsed thoroughly, and dried before placing it on the annular plate.

Static charges tend to develop with rubber due to stretching and due to just sitting in dry air thereby tending to either attract the wafers or dispel them. Although the wafers can be lifted by a vacuum pickup tool with some success, it has been found to be more reliable, especially with large number of wafers, to use a silicone resin on the disc.

Silicone rubber or silicone resin deposited as a coating on a glass disc, can be used for holding wafers in proper orientation, as described in the Wanesky application previously mentioned. The wafers adhere due to a vacuum effect in a manner suitable for processing. However, the wafers can be easliy removed with a pickup tool or with tweezers. In lieu of the glass disc, a metal disc coated with the silicone resin can be held to the transfer arm by magnetic attraction.

It is desirable to use the transfer arm 58 slidably mounted with the bracket 59, in lieu of manual handling, because, with manual handling, an operator, if nervous, may disrupt the pattern of the spaced wafers when depositing the adhesive coated disc. With the embodiments as shown in FIGS. 6 to 8, steady operation is easily obtainable.

In other embodiments, it may be desirable to fracture the slice while it rests on a non-porous rubber sheet. Attracting a slice to the non-porous rubber sheet can be achieved by forming a sandwich from the rubber sheet, the slice, and a non-porous film such as cellophane. The air between the cellophane and the rubber sheet can be removed by placing the rubber sheet, the cellophane, and the slice in a fixture wherein air is removed from the sandwich. The fixture could also support the sandwich to enable the slice to be broken by a suitable tool without disrupting the broken wafers. In order to separate the wafers from each other and to maintain their original orientation, the vacuum which was applied to the fixture would be terminated and the cellophane removed from the sandwich. Then, the rubber sheet would be stretched in order to expand the matrix.

Typically, air pressure in the neighborhood of 30 p.s.i. gauge can be applied to raise the pedestal. "Vacuum" in the neighborhood of 25 inches of mercury can be applied to both the pedestal and to the arm.

There has been described apparatus and methods for accepting scribed slices, breaking the slices without losing their orientation, and transferring the complete broken slices to a suitable support for subsequent handling, such as wafer selection and bonding.

In addition, novel articles are produced by practicing the teachings herein, namely a composite assembly of articles and a supporting member including a stretched sheet of material, and a plurality of articles on the sheet arranged in a predetermined spaced, planar array with the spacing governed by the degree of stretching of the sheet. In particular, the articles are freshly broken semiconductor wafers, and the sheet is stretched in all directions in its plane to separate the wafers from each other while preserving their relative positions in the array.

It should be apparent that the above-identified embodiments are simply illustrative of the principles of the invention and numerous other modifications may be devised without departing from the spirit and scope of the invention.

What is claimed is:

1. A method of separating plurality of articles initially disposed in an array, comprising:
   placing the articles in such initial array on a resilient substrate; and
   stretching the substrate to effect a spaced separation among the articles.

2. A method of handling a group of articles which initially are arranged in a closely spaced planar array so as to separate the articles from each other by predetermined amounts, while maintaining their relative positions with respect to each other, comprising:
   placing the articles in the closely spaced array on a stretchable sheet of material; and then
   stretching the sheet in such manner as to effect a spaced separation among the articles desired amounts while preserving their relative positions in the array.

3. The method as recited in claim 2, wherein:
   the stretching of the sheet is stopped at a point where the articles are separated by desired amounts; and
   the articles are thereafter removed from the sheet as a group in the desired spaced array by a transfer member capable of preserving the articles in spaced state.

4. The method as recited in claim 3, wherein the articles are removed from the sheet and stored by:
   contacting the spaced articles on the sheet with a transfer member coated with a material which attracts the articles with sufficient force that the articles can be removed from the sheet as a group; and removing the transfer member from the sheet to remove the articles therefrom, the attractive material being such that the articles detachably adhere to the transfer member for storage in the spaced state.

5. The method as recited in claim 3, for use with nonmagnetic articles, wherein the articles are removed from the sheet and stored by:

contacting the spaced articles on the sheet with a transfer member having magnetic properties;

temporarily holding the articles against the transfer member with sufficient force that the articles can be removed from the sheet as a group;

removing the transfer member from the sheet to remove the articles therefrom;

covering the articles on the transfer member with a retaining member having magnetic properties, the magnetic properties of the transfer and retaining members being such that those members attract each other sufficiently to form a sandwich-like package containing the spaced articles held firmly therebetween so that the articles may be stored in the spaced state; and releasing the temporary holding force.

6. The method as recited in claim 5, wherein:
the transfer member is porous; and
the temporary holding step is accomplished by applying a vacuum to the transfer member to hold the articles against the transfer member.

7. The method as recited in claim 2, wherein the articles are initially held against the stretchable sheet in the closely spaced state by vacuum, the sheet being sufficiently porous to permit the articles to be drawn against one surface thereof by vacuum applied against the other surface.

8. The method as recited in claim 2, for use with articles which are formed by breaking a solid element into the individual articles, wherein:

the unbroken element is initially placed on a porous resilient sheet and vacuum is applied to hold it against the resilient sheet;

the element is thereafter broken to form the individual closely spaced articles while on the resilient sheet; and the individual articles are thereafter removed from the resilient sheet in a group and placed on the stretchable sheet.

9. A method of breaking a frangible member having scribed lines thereon definitive of a predetermined configuration of component parts to be formed and separating the broken component parts, comprising:

placing the frangible member on a deformable member;

pressing the frangible member against the deformable member to break the frangible member along the scribed lines; and deforming the deformable member to stretch the surface thereof to effect a spaced separation among the component parts.

10. The method as recited in claim 9, further comprising:

contacting the separated component parts on the deformable member with a transfer member adapted to attract the parts; and removing the transfer member to withdraw the parts from the deformable member while retaining their proper orientation.

11. A method of forming a two-dimensionally spaced array of discrete semiconductor wafers from a compact, essentially planar array thereof, comprising:

supporting the compact array of wafers on a stretchable sheet of material;

applying a plurality of diametrically opposed planar stretching forces to the sheet to stretch it sufficiently to effect a spaced separation among the wafers into a two-dimensionally spaced array while preserving their relative positions in the array.

12. The method as recited in claim 11, further comprising:

removing the spaced array of wafers, as a group, from the stretched sheet with a transfer member capable of removing the wafers and preserving their positions in the spaced array.

13. The method as recited in claim 12, wherein the removing step is performed by:

placing an attractive member against the exposed surfaces of the spaced wafers, the attractive member having a wafer-contacting surface which attracts the wafers with sufficient force that they can be removed from the stretched sheet as a group; and inverting the attractive member to remove the wafers in the spaced array.

14. The method as recited in claim 12, wherein the removing step is performed by:

covering the spaced wafers on the stretched sheet with a transfer member susceptible of attraction by magnetic force;

holding the spaced wafers firmly against the transfer member;

inverting the transfer member while the wafers remain held thereagainst to expose the surfaces of the wafers previously in contact with the sheet; and covering the exposed surfaces of the wafers with a sheet of magnetic material capable of attracting the transfer member to form a sandwich-like package containing the separated wafers held firmly between the transfer member and the magnetic sheet.

15. A method of forming a spaced array of discrete semiconductor wafers from a slice of semiconductor material scribed on one face thereof, comprising:

(a) placing the semiconductor slice on one surface of a resilient, stretchable supporting diaphragm with the scribed face thereagainst, the diaphragm having a center and a peripheral edge;

(b) supporting the peripheral edge of the diaphragm to form a resilient, slice-breaking surface;

(c) pressing the slice against the resilient diaphragm to break said slice along the scribe lines and form individual wafers; and (d) stretching the diaphragm uniformly in directions outwardly from the center until a predetermined separation is effected among adjacent wafers.

16. The method as recited in claim 15, further comprising:

applying vacuum to the other surface of the diaphragm after step (b) and during step (c), the diaphragm being sufficiently porous that the vacuum holds the slice against movement on said one surface;

removing the vacuum after step (c) to release the wafers for movement during step (d);

covering the faces of the separated wafers that are opposite the diaphragm with a wafer supporting member after step (d);

holding the separated wafers against the wafer supporting member; and inverting the wafers and the supporting member to effect a separation between the diaphragm and the wafers.

17. A method of separating semiconductor wafers from a slice of semiconductor material having scribed lines on one face thereof definitive of a predetermined configuration of component wafers to be formed, comprising:

placing the slice on a porous support with the scribed face down;

placing a sheet of non-porous material over said slice;

applying vacuum to the support to attract the sheet and slice thereto;

breaking the slice into individual wafers by applying forces to and fro against the sheet covered slice;

removing the sheet;

lowering a porous transfer member until contact is made with the wafers, and holding in this position while vacuum is applied to said transfer member and vacuum is removed from the support;

raising the transfer member to remove the wafers from the sheet;

lowering the transfer member until the wafers make contact with a sheet of rubber, and holding in this latter position while terminating the vacuum applied to said transfer member;

raising the transfer member to leave the wafers supported on the rubber sheet;

stretching at least the portion of the sheet supporting wafers, thereby spreading the wafers;

lowering a pick-up member coated with an attractive material until contact is made with the spread wafers; and removing the pick-up member with the spread wafers thereon.

18. Apparatus for separating a plurality of individual articles initially disposed in an array, comprising:
a substrate having deformable properties for supporting the articles in the initial array; and
means for stretching said substrate to effect a spaced separation among the articles.

19. Apparatus as recited in claim 18, wherein:
said substrate is a planar, stretchable sheet; and
said stretching means is designed to stretch said sheet along axes lying in the plane of said sheet.

20. Apparatus as recited in claim 19, wherein:
said stretching means is designed to stop the stretching of the sheet at a point where the articles are separated by desired amounts to provide a spaced array of the articles on the sheet; and
transfer means are provided, for removing the articles from the sheet as a group in the desired spaced array.

21. Apparatus as recited in claim 19, wherein:
said stretchable sheet is porous; and
releasable means are provided for applying vacuum to the surface of the sheet opposite from that on which the articles are supported, to draw the articles against the sheet.

22. Apparatus for breaking a frangible member into parts and for separating the broken components parts, comprising:
a deformable and stretchable substrate for supporting the member;
a tool for breaking the member into its component parts by applying force thereto against said deformable substrate; and
means for stretching said substrate to effect a spaced separation among the component parts.

23. Apparatus as recited in claim 22, wherein:
said stretchable substrate is a porous, planar sheet;
said stretching means is designed to stretch said sheet along axes lying in the plane thereof;
a protective film is provided, which is placed over said frangible member prior to its being broken; and
a vacuum chuck is provided for holding the porous sheet, the frangible member, and the protective film thereto to permit the breakage of said frangible member with said tool without disturbing the orientation of said component parts.

24. Apparatus for separating semiconductor wafers which initially are disposed in a compact planar arrangement, with adjacent wafers in substantially abutting relationship, comprising:
a stretchable sheet of material, for supporting the wafers thereon in the compact planar arrangement; and
means for stretching said sheet to effectuate a spaced separation among all said abutting wafers.

25. Apparatus for breaking a slice of semiconductive material having scribed lines thereon definitive of a predetermined configuration of component wafers to be formed, and for separating the component wafers, comprising:
a deformable substrate for supporting the scribed slice;
a tool for pressing the slice against the deformable substrate to break the slice along the scribed lines into a plurality of component wafers;
a stretchable substrate for supporting the broken slice; and
means for expanding said stretchable substrate, by stretching, to separate said wafers.

26. The apparatus as recited in claim 25, wherein said deformable substrate and said stretchable substrate comprise a single substrate.

27. The apparatus as recited in claim 25, wherein said deformable and stretchable substrates are different substrates.

28. The apparatus as recited in claim 25, wherein:
said expanding means is designed to stretch said substrate radially, so that a broken semiconductor slice can be expanded into a spaced array of component wafers;
said deformable substrate is porous;
a protective film is provided, which is placed over the supported scribed slice prior to breakage thereof;
a vacuum chuck is provided, for holding the porous substrate, the scribed slice, and the protective film thereto to permit breakage of the slice by said tool into component wafers without disturbing the orientation of the component wafers; and
a transfer member is provided, for covering the separated wafers upon the stretchable substrate and for removing the wafers from the substrate as a group in the spaced array.

29. Apparatus for separating semiconductor wafers which are initially in a compact arrangement with adjacent wafers in substantially abutting relationships, which comprises:
a diaphragm including a resilient, stretchable portion for supporting the wafers thereon in their initial compact arrangement, said diaphragm having a peripheral edge;
means for holding said diaphragm in an initially flat condition so that said wafers lie supported on said stretchable portion; and
means coupled to the peripheral edge of said diaphragm for applying an outwardly directed uniform force to stretch said stretchable portion until a predetermined separation is effected among adjacent wafers.

30. A spaced composite assembly of articles and a supporting member, which comprises:
a stretched sheet of a deformable material; and
a plurality of articles on the sheet arranged in a predetermined spaced, planar array with the spacing governed by the degree of stretching of the sheet.

31. An assembly as recited in claim 30, wherein the sheet is sufficiently porous to permit the articles to be drawn against one surface thereof by vacuum applied against the other.

32. An assembly as recited in claim 30, wherein the articles are freshly broken semiconductor wafers, and the sheet is stretched in all directions in its plane to separate the wafers from each other while preserving their relative position in the array.

33. A composite assembly for storing nonmagnetic articles in a spaced array, comprising:
a first member having magnetic properties, on which the articles are deposited in the desired spaced array; and
a second member having magnetic properties and covering the articles on the first member, the magnetic properties of the two members being such that they attract each other sufficiently to form a sandwich-like package containing the spaced articles held firmly therebetween so that the articles may be stored in the spaced state.

34. The assembly recited in claim 33, wherein one member consists of sintered nickel and the other consists of magnetic rubber.

35. The assembly recited in claim 33, wherein the articles are freshly broken semiconductor wafers.

References Cited

UNITED STATES PATENTS

| | | | |
|---|---|---|---|
| 2,194,551 | 3/1940 | Holman | 140—109 |
| 2,608,750 | 9/1952 | Cluzel | 29—448 |
| 2,970,730 | 2/1961 | Schwarz | 225—2 |
| 3,040,489 | 6/1962 | Da Costa | 53—21 |
| 3,206,088 | 9/1965 | Meyer et al. | 225—2 |

THOMAS H. EAGER, *Primary Examiner.*

U.S. Cl. X.R.

29—203, 423, 583; 53—21; 206—69; 225—2